(12) United States Patent
Le et al.

(10) Patent No.: US 11,507,757 B2
(45) Date of Patent: Nov. 22, 2022

(54) SYSTEMS AND METHODS FOR GENERATING DYNAMIC CONVERSATIONAL RESPONSES BASED ON HISTORICAL AND DYNAMICALLY UPDATED INFORMATION

(71) Applicant: Capital One Services, LLC, McLean, VA (US)

(72) Inventors: Minh Le, McLean, VA (US); Parag Jain, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/232,206

(22) Filed: Apr. 16, 2021

(65) Prior Publication Data

US 2022/0335222 A1  Oct. 20, 2022

(51) Int. Cl.
*G06F 40/35* (2020.01)
*H04L 67/1097* (2022.01)
*G06F 3/04842* (2022.01)
*H04L 67/50* (2022.01)

(52) U.S. Cl.
CPC .......... *G06F 40/35* (2020.01); *G06F 3/04842* (2013.01); *H04L 67/1097* (2013.01); *H04L 67/535* (2022.05)

(58) Field of Classification Search
CPC .............................. G06F 40/35; H04L 67/535
See application file for complete search history.

(56) References Cited

U.S. PATENT DOCUMENTS

| | | | |
|---|---|---|---|
| 2017/0337199 A1* | 11/2017 | Kogan | H04W 4/14 |
| 2018/0329990 A1* | 11/2018 | Severn | G06F 16/93 |
| 2020/0074984 A1* | 3/2020 | Ho | G10L 15/22 |
| 2020/0151253 A1* | 5/2020 | Wohlwend | G06K 9/6269 |
| 2020/0387980 A1* | 12/2020 | Tilkiyan | G06Q 10/0639 |
| 2021/0192140 A1* | 6/2021 | Galley | G06F 40/56 |
| 2021/0224818 A1* | 7/2021 | Choudhary | G06N 3/08 |
| 2021/0375280 A1* | 12/2021 | Wang | G10L 13/027 |

FOREIGN PATENT DOCUMENTS

WO  WO-2016195912 A1 * 12/2016 ......... G06F 17/2881

* cited by examiner

*Primary Examiner* — Roland J Casillas
(74) *Attorney, Agent, or Firm* — Perkins Coie LLP

(57) ABSTRACT

Methods and systems disclosed herein collect user data in real-time and organize them (e.g., using collaborative filtering) into groups (e.g., clusters). The system then determines statistical distributions of observed real-time intents (e.g., based on actual selections made by users) for each group. The system then merges this distribution with existing model predictions (e.g., a model trained on historical training data) to balance between historical and dynamically updated information.

20 Claims, 6 Drawing Sheets

SYSTEMS AND METHODS FOR GENERATING DYNAMIC CONVERSATIONAL RESPONSES BASED ON HISTORICAL AND DYNAMICALLY UPDATED INFORMATION

BACKGROUND

In recent years, the amount and uses of interactive programs has risen considerably. In tandem with this rise, is the need to have human-like interactions and/or create applications that mimic the tone, cadence, and speech patterns of humans. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. Conversational responses include communications between a user and a system that may maintain a conversational tone, cadence, or speech pattern of a human during an interactive exchange between the user and the system. The interactive exchange may include the system responding to one or more user actions (which may include user inactions) and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real-time or near real-time) and accurately the intent, goal, or motivation behind a user input. These user input or actions may take various forms including speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more machine learning models.

For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, feature inputs for similar intents (e.g., a first intent of a user to learn about a first set of information and a second intent of a user to learn about a second set of information) may have similar feature inputs as much of the underlying aggregated information may be the same. Moreover, training data for a machine learning model (e.g., known intents and labeled feature inputs) may be sparse.

To overcome this limitation, conventional machine learning models relying on gathering training data over a long period of time. For example, training data sets may be amassed through years of collected data. By amassing the data in this manner, the amount of total data (even when that data is sparse for a given time period) is increased. However, this creates an additional problem in that despite the large amounts of data, if new information is statistically different from the learning batch, the predictions trained by the model become impaired.

To overcome these technical challenges, the methods and systems disclosed herein collects user data in real-time and organizes them (e.g., using collaborative filtering) into groups (e.g., clusters). The system then determines statistical distributions of observed real-time intents (e.g., based on actual selections made by users) for each group. The system then merges this distribution with existing model predictions (e.g., a model trained on historical training data) to balance between historical and dynamically updated information.

In some aspects, methods and systems are disclosed for generating dynamic conversational responses based on historical and dynamically updated information. For example, the system may receive multi-modal user data in response to a user interacting with a user interface. The system may generate a first feature input based on the user data. The system may determine a first user cluster for the user based on the first feature input, wherein the first user cluster comprises users having a first actual intent. The system may determine a first distribution of probable intents, wherein the first distribution of probable intents is for a subset of users corresponding to the first user cluster, and wherein the first distribution of probable intents is based on actual intents of the subset of users during a first time period. The system may generate a second feature input based on the user data. The system may determine a second distribution of probable intents based on the second feature input, wherein the second distribution of probable intents is for the user, and wherein the second distribution of probable intents is based on actual intents of users in a plurality of clusters during a second time period. The system may determine a first probable intent of the user based on a weighted average of the first distribution and the second distribution. The system may generate for display, on the user interface, a first dynamic conversational response based on the first probable intent of the user.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
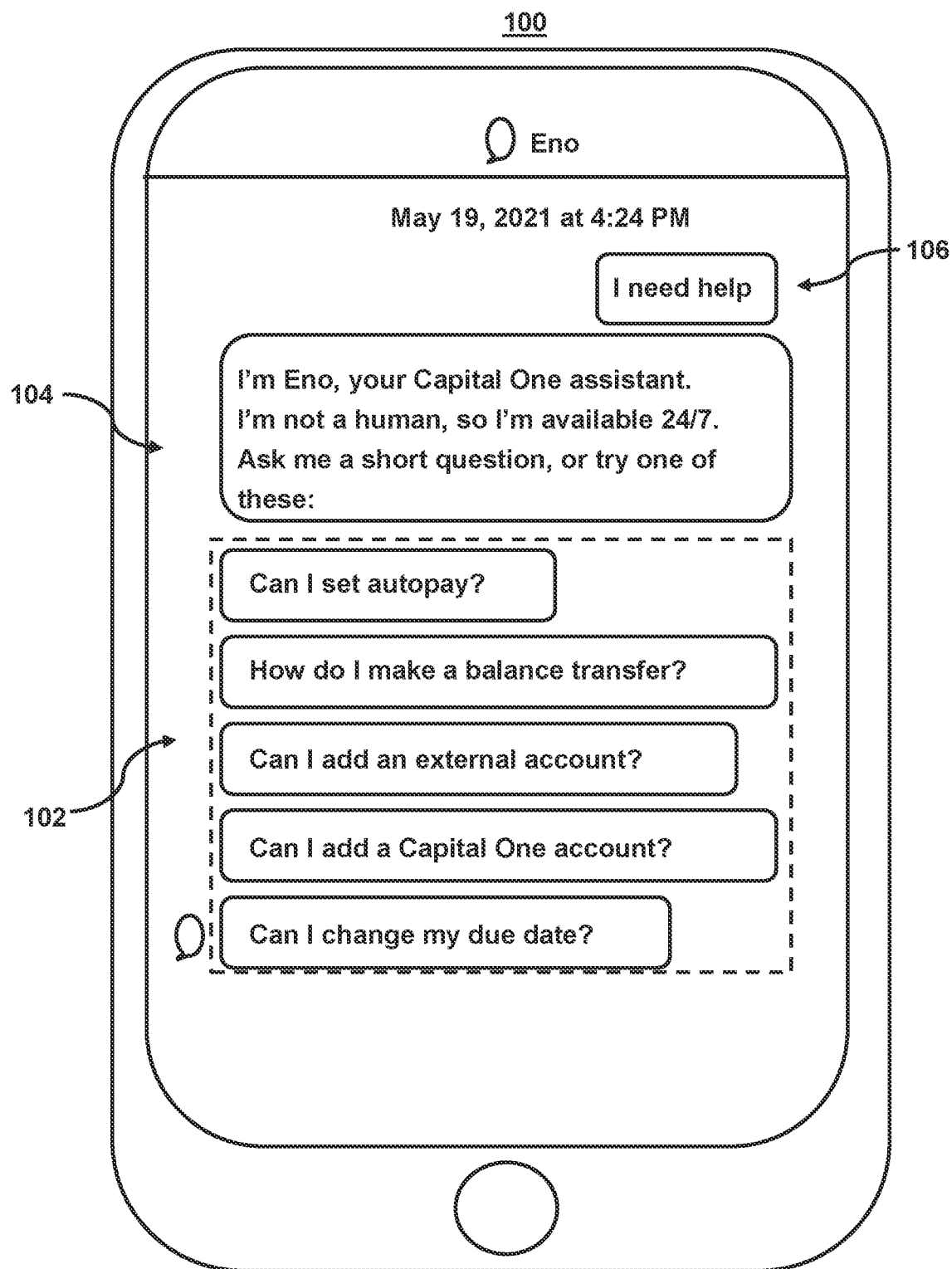
FIG. 1 shows an illustrative user interface for presenting dynamic conversational responses using machine learning models, in accordance with one or more embodiments.

FIG. 1 shows an illustrative user interface for presenting dynamic conversational responses using machine learning models, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). For example, the system may use one or more artificial intelligence models (including machine learning models, neural networks, etc.) referred to here collectively as "models."

In order to maintain the conversational interaction, the system may need to generate responses (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100, inputting a query (e.g., query 106) into user interface 100, and/or a prior action (or lack thereof) by a user to a prior response generated by the system, the system may take one or more steps to generate dynamic conversational responses (e.g., response 104). These steps may include retrieving data about the user, retrieving data from other sources, monitoring user actions, and/or other steps in order to generate a feature input (e.g., as discussed below). In some embodiments, the system may generate a plurality of responses (e.g., responses 102).

In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, the information (e.g., a user action) may include conversation details, such as information about a current session, including a channel or platform, e.g. desktop web, iOS, or mobile, a launch page (e.g., the webpage that the application was launched from), a time of launch, and/or activities in a current or previous session before launching the application. The system may store this information and all the data about a conversational interaction may be available in real-time via HTTP messages and/or through data streaming or from more sources (e.g., via an API.).

In some embodiments, the information (e.g., a user action) may include user account information such as types of accounts the user has, other accounts on file, such as bank accounts for payment, information associated with accounts, such as credit limit, current balance, due date, recent payments, or recent transactions. The system may obtain this data in real-time for model prediction through enterprise APIs.

In some embodiments, the information (e.g., a user action) may include insights about users provided to the application (e.g., via an API) from one or more sources, such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

Figure 2A:
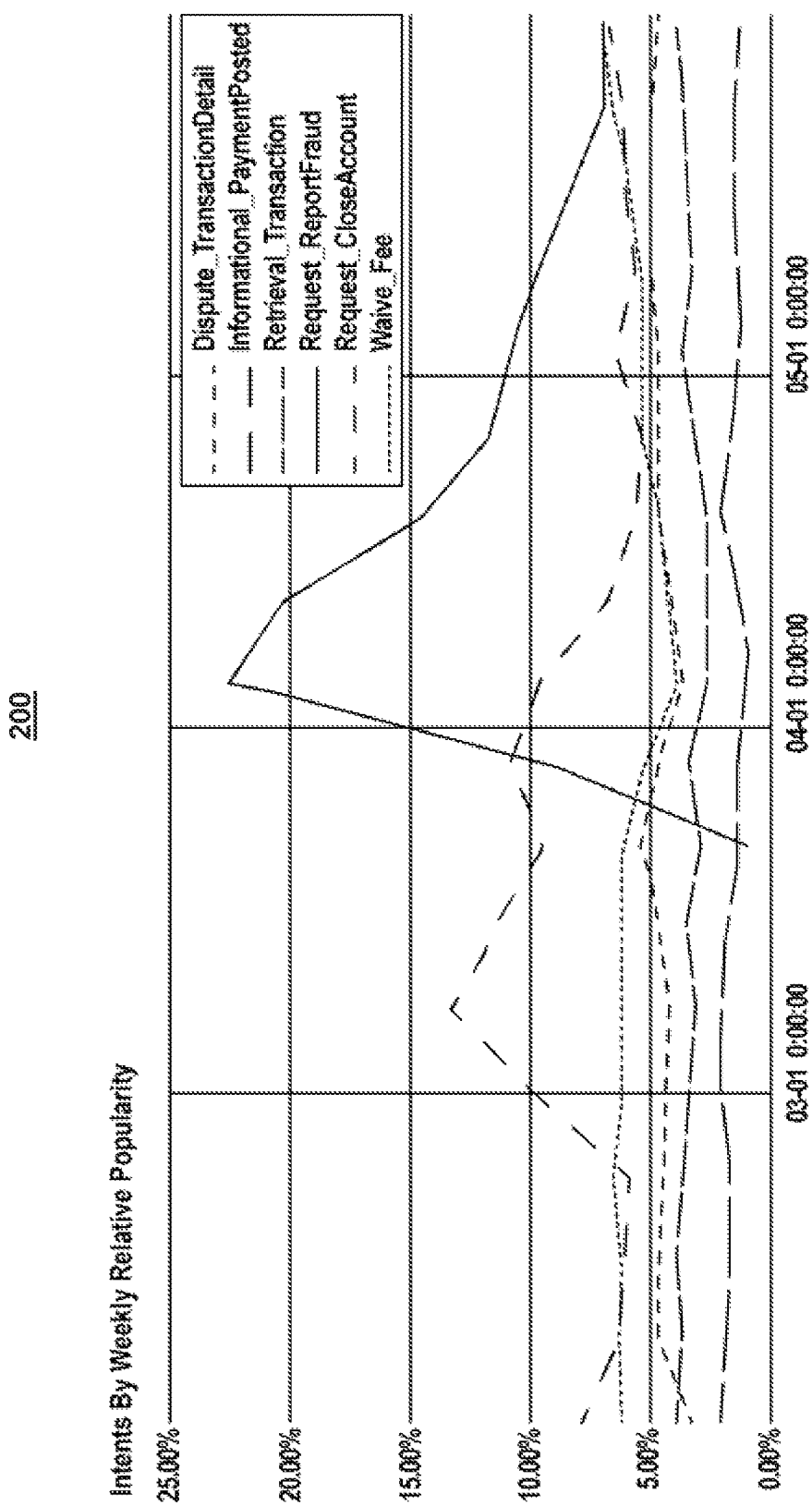
FIGS. 2A-C show illustrative diagrams for how historical and dynamically updated information is used for generating dynamic conversational responses, in accordance with one or more embodiments.
Figure 2B:
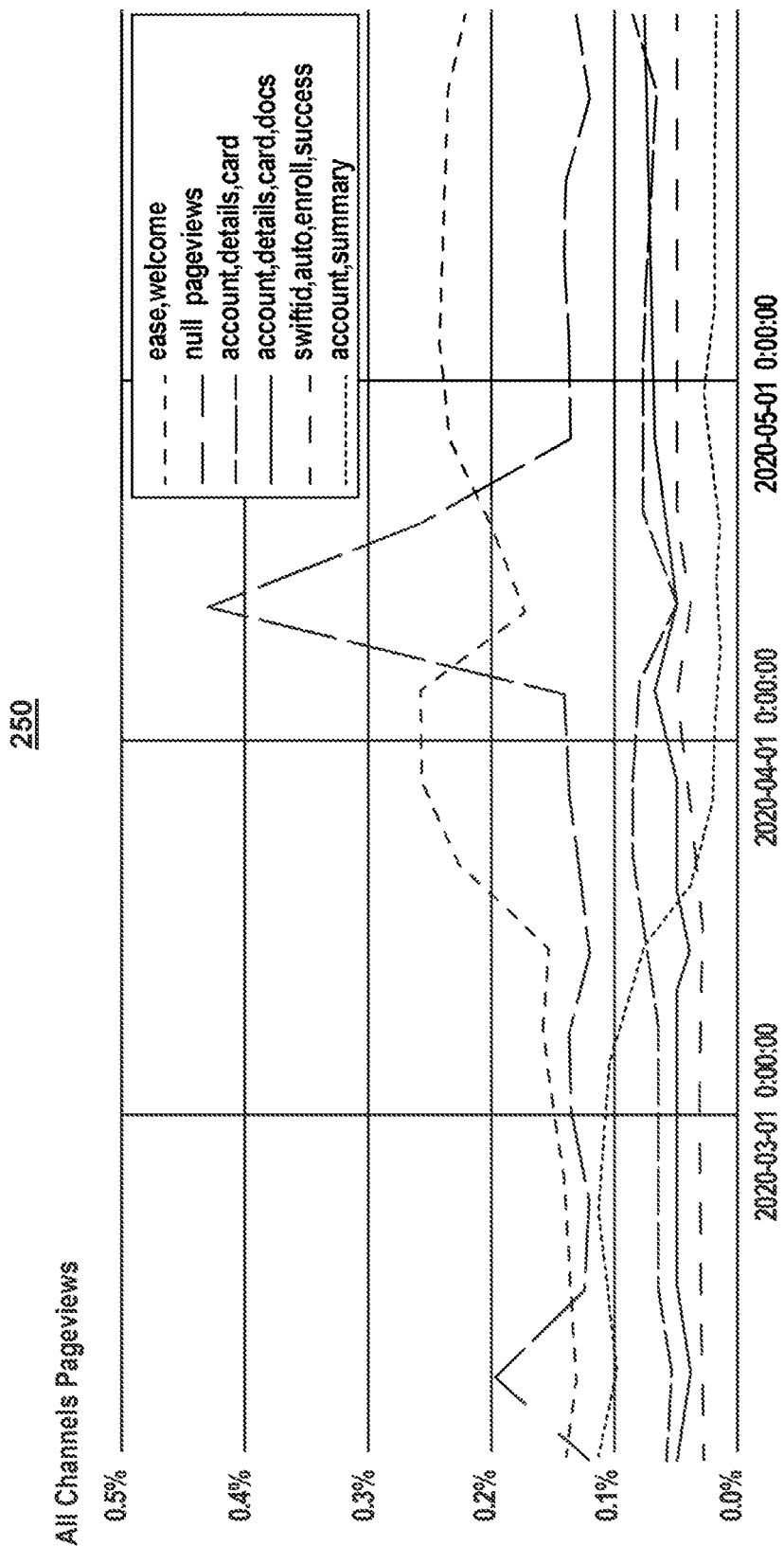
Figure 2C:
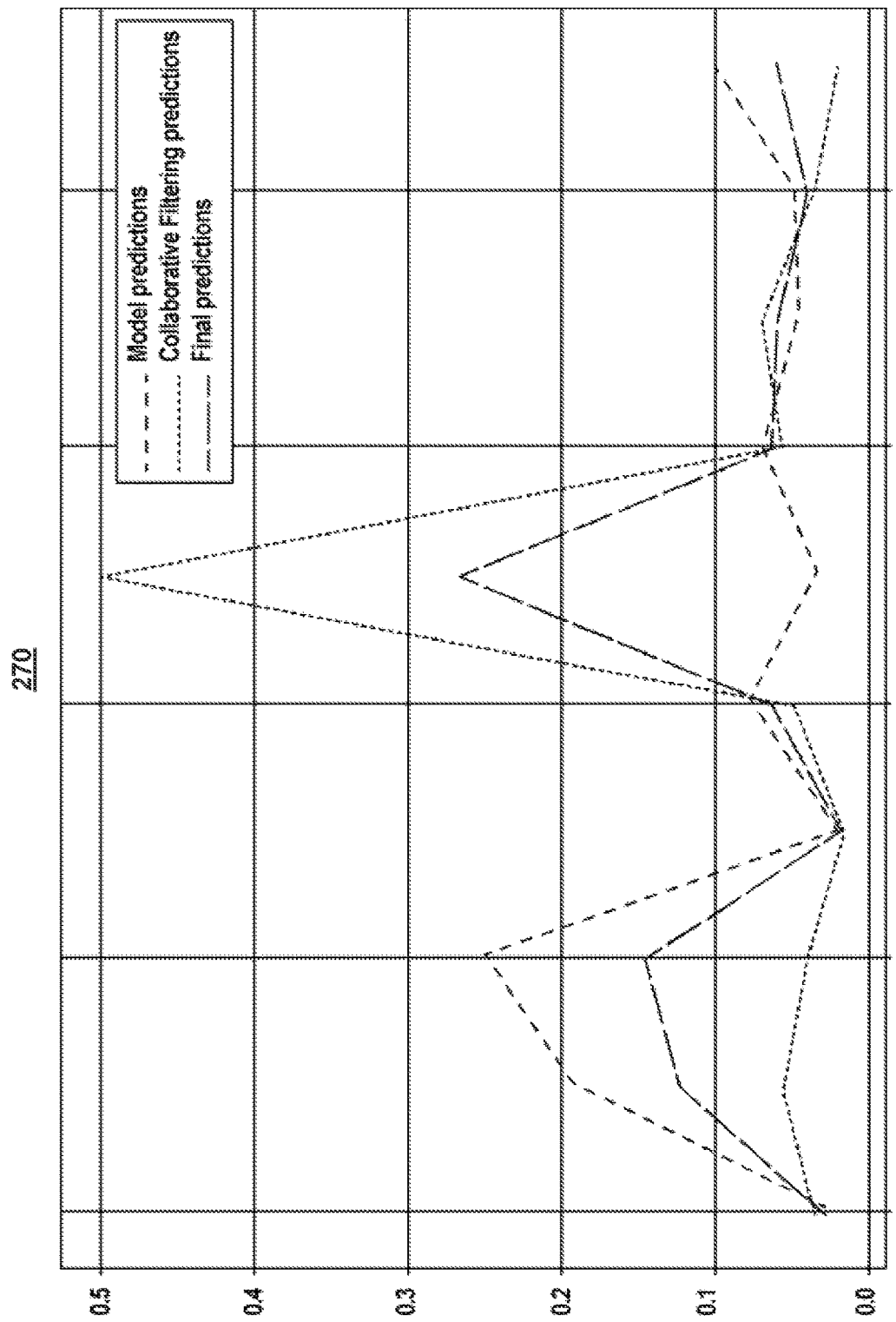

FIGS. 2A-C show illustrative diagrams for how historical and dynamically updated information is used for generating dynamic conversational responses, in accordance with one or more embodiments. FIG. 2A shows diagram 200. Diagram 200 illustrates various user intents by a weekly popularity over a given time period. For example, as shown in diagram 200, user intents for during the first week of April (e.g., "04-01") dramatically increased for intents related to fraud. For example, this week may have corresponded to a news report related to a cybersecurity breach that resulted in widespread fraud. Notably, the presence of the spike in user intents may be missed by conventional machine learning models, as those models may be trained on data sets that did not feature dramatic spikes in user intents related to fraud. As such, the machine learning models are not trained to detect real-time updates and/or a surge in user intents based on real-time changes.

Furthermore, if the training data featuring the surge is simply incorporated into the training data set for the machine learning model, the future predictions of the machine learning model will be biased. For example, the model will be trained to expect dramatic spikes in user intents related to fraud to occur in the future based on this presence of the one-time spike. Thus, conventional models (e.g., those trained using conventional training mechanism and/or with conventional architectures) fail to both identify dramatic changes at the time of the dramatic change and will be biased in future predictions.

To overcome this problem, the methods and systems disclosed herein collect user data in real-time and organize them (e.g., using collaborative filtering) into groups (e.g., clusters). For example, the system may identify characteristics of particular users (e.g., demographics, geographic area, previous interactions, etc.) and determine the actual intent of a user over a recent time period. For example, the system may determine the actual intent of users. The system may do this based on a user selection of a response of a plurality of responses (e.g., responses 102 (FIG. 1)), in which each response corresponds to a given user intent. The system may then compare characteristics of users to determine a category of users that are likely to have a given intent.

For example, FIG. 2B illustrates diagram 250 of pageview data (e.g., a page previously viewed by a user) where users whose actual intent (e.g., as determined by a subsequent selection of a response) is related to fraud dramatically spiked for users that did not view any previous pages (e.g., "null, pageviews"). The system may therefore determine that if a user accesses the system without visiting a page, the user has a higher likelihood of having an intent related to fraud. It should be noted that the system may use any characteristics of users and/or groups of users to define user groups.

In some embodiments, the system may use collaborative filtering. For example, the system may filter information or patterns using techniques involving collaboration among multiple agents, viewpoints, data sources, etc. That is, the system may make automatic predictions (e.g., filtering) about the interests of a user by collecting preferences or taste information from many users (e.g., collaborating). In some embodiments, the system may use a memory-based approach for collaborative filtering, in which the system uses user rating data to compute the similarity between users and/or characteristics of users. For example, the system may use a neighborhood-based collaborative filtering approach and/or intent-based/user-based top-N recommendations approach. Notably, this approach has a high level of interpretability (e.g., the ability to determine the value of different characteristics in the filtering) of the results. Additionally, this approach is both easy to create and to use, but also makes it easy to facilitate new data. This ease of use may aid in incorporating the new data in real-time as described herein. It should also be noted that the memory data structure used for implementing the collaborative filtering may be updated as additional inputs (e.g., user selection indicating actual user intents) are received.

For example, in user based approaches, the system generates a probability rating, r, of an intent, i, of a user, u, based on an aggregation of other users' intent:

$$r_{u,i} = \text{aggr}_{u' \in U} r_{u',i}$$

In such cases, where U denotes the set of top N users that are most similar to user, u, who had an intent, i. Some examples of the aggregation function include:

$$r_{u,i} = \frac{1}{N} \sum_{u' \in U} r_{u',i}$$

$$r_{u,i} = k \sum_{u' \in U} simil(u, u') r_{u',i}$$

where k is a normalizing factor defined as:

$$k = 1 \bigg/ \sum_{u' \in U} |simil(u, u')|$$

$$r_{u,i} = \overline{r_u} + k \sum_{u' \in U} simil(u, u')(r_{u',i} - \overline{r_{u'}})$$

where $\overline{r_{u'}}$ is the average rating of user u for all the items rated by u. The neighborhood-based algorithm calculates the similarity between two users, and the system may then produce a prediction for the user by taking the weighted average of all the ratings. The system may then compare similarity between users through the use of Pearson correlation and vector cosine.

Additionally or alternatively, the system may use a model based approach that uses one or more collaborative filtering models (e.g., including Bayesian networks, clustering models, latent semantic models such as singular value decomposition, probabilistic latent semantic analysis, multiple multiplicative factor, latent Dirichlet allocation, and/or Markov decision process based models). The system may also use latent models (e.g., dimensionally reduced versions of the model) in order to reduce the processing time and power required to cluster users. For example, reducing the processing time and power required allows for the system to be used for generating real-time results and/or allowing the system to be run on a mobile device.

The systems described may also use a hybrid collaborative filtering approach (e.g., a combination of the memory-based approach and a model-based approach). For example, the system may use a hybrid of intents-based and user-based similarities to cluster customers. Moreover, the system may use the memory-based algorithms, but as executed through one or more of the models described. The system may use collaborative filtering based on intents-based and user-based similarities by combining collaborative filtering based on intents similarities and collaborative filtering based on user similarities together. As such, the system may use collaborative filtering based on intents and users to analyze an intent-user matrix to identify a correlation between an intent and user characteristic, generate similar intents for a given user (or user characteristic), and determine a number of available users for target intents.

The system may then use the hybrid collaborative filtering approach to organize users into clusters. The system may then derive a statistical distribution of observed real-time intents for each group. The system may then merge this distribution with existing predictions (e.g., based on a machine learning model trained on historical data) to balance between historical and dynamically updated information. For example, FIG. 2C is illustrative of an example of how historical and dynamically updated information is merged.

As shown in diagram 270, the "final prediction" data acts as a balance between the model based on historical predictions ("model predictions") and dynamically updated information (e.g., "collaborative filtering predictions"). For example, to generate the "final prediction" data, the system divides customers into clusters using hybrid collaborative filtering. The system then determines each cluster's distribution of intents choices (e.g., as shown in FIG. 2A) as recorded by group-wise dynamic intent predictions ("cluster_D2_intents_dist"). For each new user, the system determines intents probabilities using hybrid collaborative filtering based on the group-wise dynamic intent predictions ("HCF_D2_prediction"). The system then updates an existing model (e.g., the historical model) using weighted average approach based on a weight, W:

new_RE_predict=original_RE_prediction×W+
HCF_D2_prediction×(1−W)

The weight, W, may be algorithmically determined based on one or more factors. For example, the system may determine a number of users in the plurality of clusters and determine a weight to apply in the weighted average based on the number of users in the plurality of clusters. Alternatively or additionally, the system may determine a rate of change in the number (e.g., indicating a dramatic and sudden spike) and determine a weight to apply in the weighted average based on the rate of change in order to highlight real-time events. Alternatively or additionally, the system may determine a frequency of the intents and/or a historic popularity of the intent and determine a weight to apply in the weighted average based on the frequency of the intents and/or a historic popularity.

The system may then generate a dynamic conversational responses based on the predictions of the weighted average model. For example, the system may send a prediction to the Conversation Workflow Engine ("CWFE") via a Dialog Manager ("DM"), and then CWFE handles the rest of the session conversation between itself and the Natural Language Generation ("NLG") component. Accordingly, the system may then access the intent that user selected as part of the conversation. The system collects the information about the conversation and keeps computing and updating the hybrid collaborative filter data structure in memory with that information about the new conversation. Specifically, information about the user and/or other characteristics, such as a cluster, channel used, selected intent of the user, etc., are used for updating the hybrid collaborative filter data structure.

In some embodiments, the system may then use in-memory caching to enable control on how many conversation points are stored for use in hybrid collaborative filtering. For example, the system may use Redis caching or Python native dictionary caching. The system may then utilize the stored hybrid collaborative filtering filter data structure to apply the weighted average approach as described above on top of the model predictions for any new conversation or invocation of model used to provide predictions.

Figure 3:
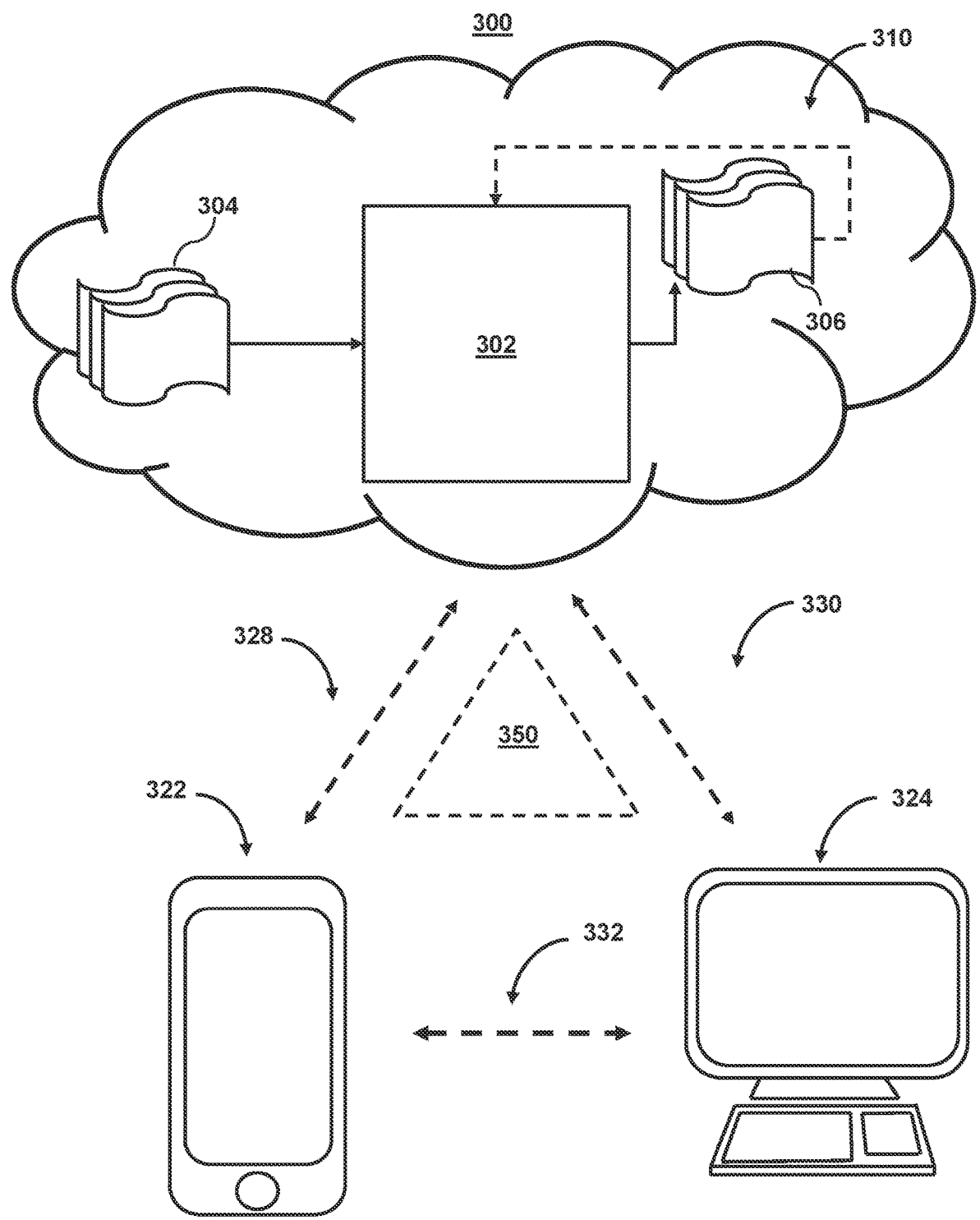
FIG. 3 shows illustrative system components for generating dynamic conversational responses based on historical and dynamically updated information, in accordance with one or more embodiments.

FIG. 3 shows illustrative system components for generating dynamic conversational responses based on historical and dynamically updated information, in accordance with one or more embodiments. For example, system may represent the components used for generating dynamic conversational responses, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users, may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a user intent).

In some embodiments, model 302 may predict alternative content. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions on a user's account. The output of the model (e.g., model 302) is only used to decide which location and/or delivery time offset to select.

System 300 also includes API layer 350. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside, in this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use developer portal. API layer 350 may use strong security constraints applying WAF and DDoS protection, and API layer 350 may use RESTful APIs as standard for external integration.

Figure 4:
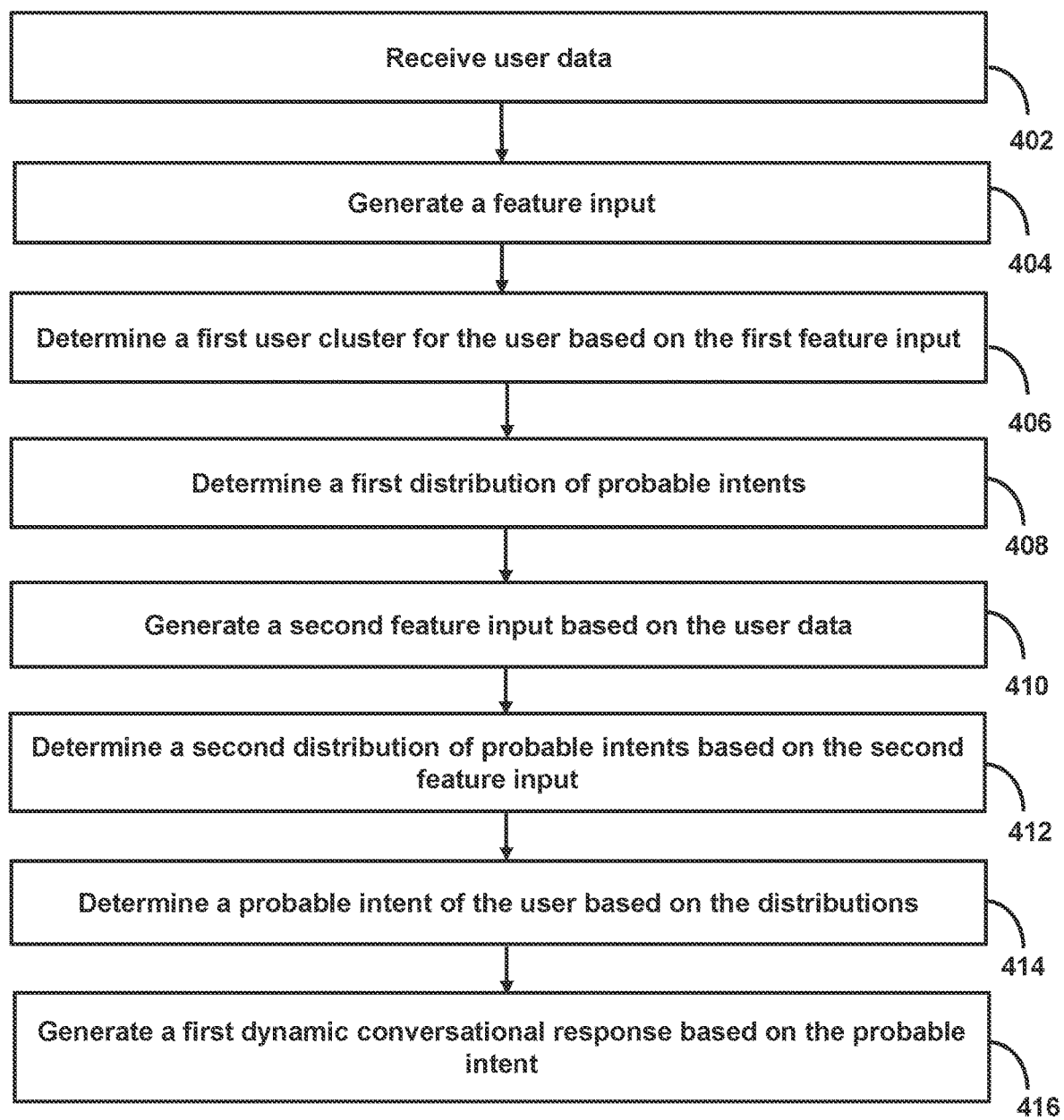
FIG. 4 shows a flowchart of the steps involved in generating dynamic conversational responses based on historical and dynamically updated information, in accordance with one or more embodiments.

FIG. 4 shows a flowchart of the steps involved in generating dynamic conversational responses based on historical and dynamically updated information. For example, the system may use process 400 (e.g., as implemented on one or more system components) in order to generate dynamic conversational responses.

At step 402, process 400 (e.g., using one or more components described in system 300 (FIG. 3)) receive user data. For example, the system may receive multi-modal user data in response to a user interacting with a user interface. For example, the multi-modal user data comprises information about the user, cohort (or cluster) assignment, channel information, and/or a selected intent of the user. For example, the system may receive user data in response to a user interacting with a user interface (e.g., user interface 100 (FIG. 1)). The user data may describe one or more characteristics of a user, a user device, and/or one or more interactions of the user with a user device and/or application generating responses.

At step 404, process 400 (e.g., using one or more components described in system 300 (FIG. 3)) generates a feature input. For example, the system may generate a first feature input based on the user data. For example, the feature input may comprise a column of data (e.g., an input set) that represents characteristics of user data from which the system may use to select a cluster for the user. Alternatively or additionally, the system may include a feature input layer that receives the feature input and applies data normalization.

At step 406, process 400 (e.g., using one or more components described in system 300 (FIG. 3)) determines a first user cluster for the user based on the first feature input. For example, the system may determine a first user cluster for the user based on the first feature input, wherein the first user cluster comprises users having a first actual intent. The system may cluster the users based on similarities of intent and/or user characteristics. For example, the system may retrieve these characteristics (e.g., characteristics of the cluster and the user) and compare them.

For the comparison, the system may use multiple types of optical character recognition and/or fuzzy logic. For example, when comparing multiple data fields (e.g., as contained in databases described below). For example, after the content-recognition module or algorithm translates text, video, and/or audio recordings into text, the system may cross-reference the translated text with a database to determine whether or not the translated text corresponds to text in a database that corresponds to characteristics of users in a cluster.

For example, the system may arrange the text into data fields and cross-reference the data fields with other data fields (e.g., in a lookup table database) corresponding to possible values associated with user and/or cluster characteristics. Using fuzzy logic, the system may determine two fields and/or values to be identical even though the substance of the data field or value (e.g., two different spellings) is not identical. In some embodiments, the system may analyze particular data fields of a data structure for particular values or text. The data fields could be associated with characteristics, other user data, and/or any other information required for the function of the embodiments described herein. Furthermore, the data fields could contain values (e.g., the data fields could be expressed in binary or any other suitable code or programming language).

For example, when determining the first user cluster for the user based on the first feature input, the system may input the first feature input into a first model, wherein the first model performs hybrid collaborative filtering based on similarities in predicted intents and user characteristics between users. The system may then receive a first output from the first model. The system may then determine the first user cluster based on the first output.

At step 408, process 400 (e.g., using one or more components described in system 300 (FIG. 3)) determines a first distribution of probable intents. For example, the system may determine a first distribution of probable intents, wherein the first distribution of probable intents is for a subset of users corresponding to the first user cluster, and wherein the first distribution of probable intents is based on actual intents of the subset of users during a first time period. For example, the system may determine a distribution of the probabilities of intents. The distribution may correspond to a multivariate analysis of a probability of a plurality of intents.

The system may use a specific model for determining the first distribution of probable intents. For example, when determining the first distribution of probable intents, the system may input group data for users in the first user cluster into a second model, wherein the second model is an unsupervised model. The system may then receive a second output from the second model. The system may then determine the first distribution based on the second output.

Additionally or alternatively, the determination may include comparing the distribution to a threshold distribution. For example, when determining the first distribution of probable intents, the system may determine a number of users in the plurality of clusters. The system may then compare the number to a threshold number. The system may then determine the first distribution of probable intents in response to determining that the number equals or exceeds the threshold number. For example, the system may set a threshold based on a total number of users for which an intent has been determined. For example, the system may prevent a cold-start problem (e.g., the model does not yet have enough information to make an accurate prediction).

Additionally or alternatively, when determining the first distribution of probable intents, the system may determine a respective number of users in each of the plurality of clusters, compare each respective number to a threshold number, and determine the first distribution of probable intents in response to determining that each respective number equals or exceeds the threshold number. For example, the system may set a threshold based on the popularity of the particular intent.

Additionally or alternatively, when determining the first distribution of probable intents, the system may determine a number of users in the first user cluster over a period of time, determine a rate of change of the number of users in the first user cluster over the period of time, compare the rate of change to a threshold rate of change, and determine the first distribution of probable intents in response to determining that the rate of change equals or exceeds the threshold rate of change. For example, the system may set a threshold based on if an intent has had a dramatic rise in popularity.

At step 410, process 400 (e.g., using one or more components described in system 300 (FIG. 3)) generate a second feature input based on the user data. For example, the system may generate a second feature input based on the user data. For example, the feature input may comprise a column of data (e.g., an input set) that represents characteristics of user data upon which the system may use to select an intent for the user (e.g., using a historical model). Alternatively or additionally, the system may include a feature input layer that receives the feature input and applies data normalization.

At step 412, process 400 (e.g., using one or more components described in system 300 (FIG. 3)) determines a second distribution of probable intents based on the second feature input. For example, the system may determine a second distribution of probable intents based on the second feature input, wherein the second distribution of probable intents is for the user, wherein the second distribution of probable intents can be based on actual intents of users in a plurality of clusters during a second time period. For example, when determining the second distribution of probable intents based on the second feature input, the system may input the second feature input into a third model, wherein the third model comprises supervised model components. The system may then receive a third output from the third model. The system may determine the second distribution based on the third output.

At step 414, process 400 (e.g., using one or more components described in system 300 (FIG. 3)) determines a probable intent of the user based on the distributions. For example, the system may determine a first probable intent of the user based on a weighted average of the first distribution and the second distribution. For example, when determining the first probable intent of the user based on the weighted average of the first distribution and the second distribution, the system may determine a number of users in the plurality of clusters, and determine a weight to apply in the weighted average based on the number of users in the plurality of clusters.

At step 416, process 400 (e.g., using one or more components described in system 300 (FIG. 3)) generates a first dynamic conversational response based on the probable intent. For example, the system may generate for display, on the user interface, a first dynamic conversational response based on the first probable intent of the user. Additionally or alternatively, the system may use the result of a user selection to update a model (e.g., a hybrid collaborative filtering model). For example, the system may receive a user selection of the first dynamic conversational response. The system may then determine an actual intent of the user based on the user selection. The system may then update the third model based on the actual intent.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses based on historical and dynamically updated information, the method comprising: receiving multi-modal user data in response to a user interacting with a user interface; generating a first feature input based on the user data; determining a first user cluster for the user based on the first feature input, wherein the first user cluster comprises users having a first actual intent; determining a first distribution of probable intents, wherein the first distribution of probable intents is for a subset of users corresponding to the first user cluster, and wherein the first distribution of probable intents is based on actual intents of the subset of users during a first time period; generating a second feature input based on the user data; determining a second distribution of probable intents based on the second feature input, wherein the second distribution of probable intents is for the user, wherein the second distribution of probable intents is based on actual intents of users in a plurality of clusters during a second time period; determining a first probable intent of the user based on a weighted average of the first distribution and the second distribution; and generating for display, on the user interface, a first dynamic conversational response based on the first probable intent of the user.

2. The method of any one of the preceding embodiments, wherein determining the first user cluster for the user based on the first feature input comprises: inputting the first feature input into a first model, wherein the first model performs hybrid collaborative filtering based on similarities in predicted intents and user characteristics between users; receiving a first output from the first model; and determining the first user cluster based on the first output.

3. The method of any one of the preceding embodiments, wherein determining the first distribution of probable intents comprises: inputting group data for users in the first user cluster into a second model, wherein the second model is an unsupervised model; receiving a second output from the second model; and determining the first distribution based on the second output.

4. The method of any one of the preceding embodiments, wherein determining the first distribution of probable intents comprises: determining a number of users in the plurality of clusters; comparing the number to a threshold number; and determining the first distribution of probable intents in response to determining that the number equals or exceeds the threshold number.

5. The method of any one of the preceding embodiments, wherein determining the first distribution of probable intents comprises: determining a respective number of users in each of the plurality of clusters; comparing each respective number to a threshold number; and determining the first distribution of probable intents in response to determining that each respective number equals or exceeds the threshold number.

6. The method of any one of the preceding embodiments, wherein determining the first distribution of probable intents comprises: determining a number of users in the first user cluster over a period of time; determining a rate of change of the number of users in the first user cluster over the period of time; comparing the rate of change to a threshold rate of change; and determining the first distribution of probable intents in response to determining that the rate of change equals or exceeds the threshold rate of change.

7. The method of any one of the preceding embodiments, wherein determining the second distribution of probable intents based on the second feature input comprises: inputting the second feature input into a third model, wherein the third model comprises supervised model components; receiving a third output from the third model; and determining the second distribution based on the third output.

8. The method of any one of the preceding embodiments, further comprising: receiving a user selection of the first dynamic conversational response; determining an actual intent of the user based on the user selection; and updating a third model based on the actual intent.

9. The method of any one of the preceding embodiments, wherein determining the first probable intent of the user based on the weighted average of the first distribution and the second distribution comprises: determining a number of users in the plurality of clusters; and determining a weight to apply in the weighted average based on the number of users in the plurality of clusters.

10. The method of any one of the preceding embodiments, wherein the multi-modal user data comprises information about the user, cohort assignment, channel information, or a selected intent of the user.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating dynamic conversational responses based on historical and dynamically updated information, the system comprising:
cloud-based storage circuitry configured to store:
a first machine learning model which performs hybrid collaborative filtering based on similarities in predicted intents and user characteristics between users;
a second machine learning model, wherein the second machine learning model is an unsupervised model; and
a third machine learning model;
cloud-based control circuitry configured to:
receive multi-modal user data in response to a user interacting with a user interface;
generate a first feature input based on the user data;
determine, using the first machine learning model, a first user cluster for the user based on the first feature input, and wherein the first user cluster comprises users having a first actual intent;
determine, using the second machine learning model, a first distribution of probable intents, wherein the first distribution of probable intents is for a subset of users corresponding to the first user cluster, wherein the first distribution of probable intents is based on actual intents of the subset of users during a first time period, and wherein determining the first distribution of probable intents comprises:
generating a second feature input based on the user data; and
determining, using the third machine learning model a second distribution of probable intents based on the second feature input, wherein the second distribution of probable intents is for the user, and wherein the second distribution of probable intents is based on actual intents of users in a plurality of clusters during a second time period;
determine a first probable intent of the user based on a weighted average of the first distribution and the second distribution;
generate for display, on the user interface, a first dynamic conversational response based on the first probable intent of the user;
receive a user selection of the first dynamic conversational response;
determine an actual intent of the user based on the user selection; and
update the third machine learning model based on the actual intent; and
generate for display, on the user interface, a second dynamic conversational response based the third model.

2. A method for generating dynamic conversational responses based on historical and dynamically updated information, the method comprising:
receiving multi-modal user data in response to a user interacting with a user interface;
generating a first feature input based on the user data;
determining a first user cluster for the user based on the first feature input, wherein the first user cluster comprises users having a first actual intent;
determining a first distribution of probable intents, wherein the first distribution of probable intents is for a subset of users corresponding to the first user cluster, and wherein the first distribution of probable intents is based on actual intents of the subset of users during a first time period;
generating a second feature input based on the user data;
determining a second distribution of probable intents based on the second feature input, wherein the second distribution of probable intents is for the user, wherein the second distribution of probable intents is based on actual intents of users in a plurality of clusters during a second time period;
determining a first probable intent of the user based on a weighted average of the first distribution and the second distribution; and
generating for display, on the user interface, a first dynamic conversational response based on the first probable intent of the user.

3. The method of claim 2, wherein determining the first user cluster for the user based on the first feature input comprises:
inputting the first feature input into a first model, wherein the first model performs hybrid collaborative filtering based on similarities in predicted intents and user characteristics between users;
receiving a first output from the first model; and
determining the first user cluster based on the first output.

4. The method of claim 2, wherein determining the first distribution of probable intents comprises:
inputting group data for users in the first user cluster into a second model, wherein the second model is an unsupervised model;
receiving a second output from the second model; and determining the first distribution based on the second output.

5. The method of claim 2, wherein determining the first distribution of probable intents comprises:
determining a number of users in the plurality of clusters;
comparing the number to a threshold number; and
determining the first distribution of probable intents in response to determining that the number equals or exceeds the threshold number.

6. The method of claim 2, wherein determining the first distribution of probable intents comprises:
determining a respective number of users in each of the plurality of clusters;
comparing each respective number to a threshold number; and
determining the first distribution of probable intents in response to determining that each respective number equals or exceeds the threshold number.

7. The method of claim 2, wherein determining the first distribution of probable intents comprises:
determining a number of users in the first user cluster over a period of time;
determining a rate of change of the number of users in the first user cluster over the period of time;
comparing the rate of change to a threshold rate of change; and
determining the first distribution of probable intents in response to determining that the rate of change equals or exceeds the threshold rate of change.

8. The method of claim 2, wherein determining the second distribution of probable intents based on the second feature input comprises:
inputting the second feature input into a third model, wherein the third model comprises supervised model components;
receiving a third output from the third model; and
determining the second distribution based on the third output.

9. The method of claim 8, further comprising:
receiving a user selection of the first dynamic conversational response;
determining an actual intent of the user based on the user selection; and
updating the third model based on the actual intent.

10. The method of claim 2, wherein determining the first probable intent of the user based on the weighted average of the first distribution and the second distribution comprises:
determining a number of users in the plurality of clusters; and
determining a weight to apply in the weighted average based on the number of users in the plurality of clusters.

11. The method of claim 2, wherein the multi-modal user data comprises information about the user, cohort assignment, channel information, or a selected intent of the user.

12. A non-transitory, computer readable medium for generating dynamic conversational responses based on historical and dynamically updated information, comprising instructions that when executed by one or more processors, causes operations comprising:
receiving multi-modal user data in response to a user interacting with a user interface;
generating a first feature input based on the user data;
determining a first user cluster for the user based on the first feature input, wherein the first user cluster comprises users having a first actual intent;
determining a first distribution of probable intents, wherein the first distribution of probable intents is for a subset of users corresponding to the first user cluster, and wherein the first distribution of probable intents is based on actual intents of the subset of users during a first time period;
generating a second feature input based on the user data;
determining a second distribution of probable intents based on the second feature input, wherein the second distribution of probable intents is for the user, wherein the second distribution of probable intents is based on actual intents of users in a plurality of clusters during a second time period;
determining a first probable intent of the user based on a weighted average of the first distribution and the second distribution; and
generating for display, on the user interface, a first dynamic conversational response based on the first probable intent of the user.

13. The non-transitory, computer readable medium of claim 12, wherein determining the first user cluster for the user based on the first feature input comprises:
inputting the first feature input into a first model, wherein the first model performs hybrid collaborative filtering based on similarities in predicted intents and user characteristics between users;
receiving a first output from the first model; and
determining the first user cluster based on the first output.

14. The non-transitory, computer readable medium of claim 12, wherein determining the first distribution of probable intents comprises:
inputting group data for users in the first user cluster into a second model, wherein the second model is an unsupervised model;
receiving a second output from the second model; and
determining the first distribution based on the second output.

15. The non-transitory, computer readable medium of claim 12, wherein determining the first distribution of probable intents comprises:
determining a number of users in the plurality of clusters;
comparing the number to a threshold number; and
determining the first distribution of probable intents in response to determining that the number equals or exceeds the threshold number.

16. The non-transitory, computer readable medium of claim 12, wherein determining the first distribution of probable intents comprises:
determining a respective number of users in each of the plurality of clusters;
comparing each respective number to a threshold number; and
determining the first distribution of probable intents in response to determining that each respective number equals or exceeds the threshold number.

17. The non-transitory, computer readable medium of claim 12, wherein determining the first distribution of probable intents comprises:
determining a number of users in the first user cluster over a period of time;
determining a rate of change of the number of users in the first user cluster over the period of time;
comparing the rate of change to a threshold rate of change; and
determining the first distribution of probable intents in response to determining that the rate of change equals or exceeds the threshold rate of change.

18. The non-transitory, computer readable medium of claim 12, wherein determining the second distribution of probable intents based on the second feature input comprises:
  inputting the second feature input into a third model, wherein the third model comprises a supervised model component;
  receiving a third output from the third model; and
  determining the second distribution based on the third output.

19. The non-transitory, computer readable medium of claim 18, wherein the instructions cause further operations comprising:
  receiving a user selection of the first dynamic conversational response;
  determining an actual intent of the user based on the user selection; and
  updating the third model based on the actual intent.

20. The non-transitory, computer readable medium of claim 12, wherein determining the first probable intent of the user based on the weighted average of the first distribution and the second distribution comprises:
  determining a number of users in the plurality of clusters; and
  determining a weight to apply in the weighted average based on the number of users in the plurality of clusters.

* * * * *